UNITED STATES PATENT OFFICE.

CARL A. NOWAK, OF CHICAGO, ILLINOIS, ASSIGNOR TO A. G. WACKENREUTER, OF CHICAGO, ILLINOIS.

CLEANING COMPOUND.

1,038,783.  Specification of Letters Patent.  Patented Sept. 17, 1912.

No Drawing.  Application filed November 27, 1911. Serial No. 662,646.

*To all whom it may concern:*

Be it known that I, CARL A. NOWAK, a citizen of the United States, residing at Chicago, in the county of Cook and State of Illinois, have invented a new and useful Improvement in Cleaning Compounds, of which the following is a specification.

The object of my invention is to provide a cleaning compound containing a high percentage of carbon tetra chlorid ($CCl_4$) in the form of an emulsion, and containing a very small percentage of water, so that the compound will be in a semi fluid condition whereby the well known cleansing properties of carbon tetra chlorid are enhanced and at the same time the product is in better condition for packaging and more convenient for use. To this end I emulsify the carbon tetra chlorid by treating it in the preferred manner hereinafter described with a solution of saponin, thereby producing a cleansing preparation in the form of an emulsion.

The procedure I prefer to practice for producing my new cleansing compound is the following: I prepare a solution containing about 3.5 per cent. of saponin ($C_{32}H_{54}O_{18}$) which I may make by dissolving the dry saponin in the requisite amount of cold water to produce the solution of about 3.5% strength and having a specific gravity of approximately 1.61 at 15° C. If desired I may use an infusion of ordinary commercial soap-bark, obtained by boiling the bark in a sufficient quantity of water for about one hour, the water being preferably rendered slightly alkaline, as by adding to it about $\frac{5}{10}\%$ of sodium hydrate, then filtering the infusion and thereafter condensing or diluting the filtration as may be required to produce an aqueous solution containing about 4 to 5% extract by weight. After the solution of saponin or the infusion of soap-bark is prepared I add to about 800 gr. of carbon tetra chlorid about 300 to 400 gr. of the solution or infusion, and the mixture thus formed is vigorously shaken or agitated in a closed vessel for about fifteen to forty-five minutes, or until a good congealing or emulsification of the carbon tetra chlorid appears. The mixture is then permitted to settle for from two to four hours, or until it has separated into two strata. The upper stratum will be the solution or infusion of the saponaceous material weakened by the amount of saponin taken up by the carbon tetra chlorid, which the saponin will have emulsified by reason of its colloidal properties, and the emulsified carbon tetra chlorid will form the lower stratum. The upper stratum is now drawn off leaving the emulsified carbon tetra chlorid in its finished condition.

Quantitative analyses of my composition, to determine the amounts of the different components thereof, shows as its percentage composition by weight, the following result, giving the maximum and minimum limits between which the amounts vary:

|  | Maximum. | Minimum. |
|---|---|---|
| Carbon tetra chlorid | 98.90% | 93.50% |
| Water | 6.00% | 1.00% |
| Saponin | 0.50% | 0.10% |
| Specific gravity at 15° C. | 1.60 | 1.55 |

The emulsified carbon tetra chlorid, resulting from treating carbon tetra chlorid according to my process, is in the condition of a thick or coagulated fluid, and is in a very advantageous form for use, since it may be supplied in collapsible tubes or bottles, and be readily applied to clothing and the like, without waste, for cleansing the same of grease-stains by rubbing, this being the particular property of the carbon tetra chlorid constituent. The emulsifying saponin, in addition to its action upon the carbon tetra chlorid will, because it carries some moisture with it from the solution, serve to remove other stains that may not be removable by the carbon tetra chlorid.

What I claim as new and desire to secure by Letters Patent is:

1. The process of preparing a cleaning compound which consists in thoroughly mixing carbon tetra chlorid and a solution of saponin, whereby the carbon tetra chlorid is emulsified, and then separating the emulsion from the solution which has not been taken up.

2. The process of preparing a cleaning compound which consists in thoroughly mixing with carbon tetra chlorid substantially twice its weight of a solution of saponin of between 3 and 4% strength, whereby the carbon tetra chlorid is emulsified, and then separating the emulsion from the solution which has not been taken up.

3. An emulsion of carbon tetra chlorid, containing more than 92% carbon tetra chlorid, less than 7% water and less than 1% saponin.

CARL A. NOWAK.

In the presence of—
A. U. THORIEN,
R. A. SCHAEFER.